(12) United States Patent
Troughton et al.

(10) Patent No.: US 11,111,821 B2
(45) Date of Patent: Sep. 7, 2021

(54) RETENTION ASSEMBLY FOR GAS TURBINE ENGINE

(71) Applicant: United Technologies Corporation, Farmington, CT (US)

(72) Inventors: Andre Herman Troughton, Windsor Locks, CT (US); Thomas Shim, Bayside, NY (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 319 days.

(21) Appl. No.: 16/574,562

(22) Filed: Sep. 18, 2019

(65) Prior Publication Data

US 2021/0079812 A1    Mar. 18, 2021

(51) Int. Cl.
| | |
|---|---|
| *F01D 25/24* | (2006.01) |
| *F01D 25/30* | (2006.01) |
| *F01D 25/26* | (2006.01) |
| *F04D 29/60* | (2006.01) |
| *F04D 29/40* | (2006.01) |
| *F01D 25/28* | (2006.01) |

(52) U.S. Cl.
CPC ......... *F01D 25/243* (2013.01); *F01D 25/246* (2013.01); *F01D 25/24* (2013.01); *F01D 25/26* (2013.01); *F01D 25/265* (2013.01); *F01D 25/28* (2013.01); *F01D 25/30* (2013.01); *F04D 29/40* (2013.01); *F04D 29/60* (2013.01); *F05D 2220/32* (2013.01); *F05D 2230/60* (2013.01); *F05D 2260/20* (2013.01)

(58) Field of Classification Search
CPC ...... F01D 25/243; F01D 25/24; F01D 25/246; F01D 25/26; F01D 25/265; F01D 25/28; F01D 25/30; F05D 2230/60; F05D 2260/20; F05D 2220/32; F04D 29/40; F04D 29/60
USPC ....................................................... 415/214.1
See application file for complete search history.

(56) References Cited

U.S. PATENT DOCUMENTS

| | | |
|---|---|---|
| 7,048,487 B2 | 5/2006 | Stone |
| 7,571,937 B2 | 8/2009 | Patel |
| 8,932,022 B2 | 1/2015 | Ivakitch et al. |
| 10,344,624 B2 | 7/2019 | McLaughlin |
| 2015/0010389 A1* | 1/2015 | Busekros ................ F01D 25/12 415/134 |
| 2016/0201490 A1* | 7/2016 | Scott ....................... F01D 25/30 415/213.1 |
| 2017/0176010 A1 | 6/2017 | Ryon et al. |

(Continued)

*Primary Examiner* — Joseph J Dallo
*Assistant Examiner* — Yi-Kai Wang
(74) *Attorney, Agent, or Firm* — Cantor Colburn LLP

(57) ABSTRACT

A retention assembly for a gas turbine engine is provided. The retention assembly may include a bolt, a spacer, a housing, a fitting component, and a conduit assembly. The housing may define at least one receiving aperture sized to receive a second portion of the shaft. The fitting component may define a first through-hole and a second through-hole sized for a first portion of the shaft and the second portion of the shaft to extend therethrough. The conduit assembly may include a conduit for securing to the fitting component such that the first through-hole is open to the conduit. The bolt, the spacer, the fitting component, and the housing may be arranged with one another to define a captive clearance fit such that a first clearance space is defined between a first surface of the second through-hole and the first portion of the bolt.

19 Claims, 9 Drawing Sheets

(56) References Cited

U.S. PATENT DOCUMENTS

2018/0340447 A1\* 11/2018 Karafillis .................. F02C 7/00
2019/0112948 A1\* 4/2019 Shurrock .............. F01D 25/243

\* cited by examiner

RETENTION ASSEMBLY FOR GAS TURBINE ENGINE

BACKGROUND

Exemplary embodiments of the present disclosure pertain to the art of securing a retention assembly to a housing of a gas turbine engine to assist in facilitating fluid communication between an engine wing and a fuel oil cooler of the gas turbine engine via a pair of conduits mounted to the retention assembly.

Previous retention assemblies may have included a fitting component, however, a structure of the previous retention assemblies interfered with finger access to thread bolts into the fitting component due to limited available clearance. Additionally, a structure of the fitting component may have caused cracks in the conduits mounted thereto.

BRIEF DESCRIPTION

Disclosed is a retention assembly for a gas turbine engine. The retention assembly includes a bolt, a spacer, a housing, a fitting component, and a conduit assembly. The bolt includes a shaft having a first portion and a second portion. The housing defines at least one receiving aperture sized to receive the second portion of the shaft. The fitting component defines a first through-hole and a second through-hole located adjacent to the first through-hole. The second through-hole is sized for the first portion of the shaft and the second portion of the shaft to extend therethrough. The conduit assembly includes a first conduit for securing to the fitting component such that the first through-hole is open to the first conduit. The bolt, the spacer, the fitting component, and the housing are arranged with one another to define a captive clearance fit such that a first clearance space is defined between a first surface of the second through-hole and the first portion of the bolt.

In addition to one or more of the features described above, or as an alternative to any of the foregoing embodiments, the fitting component may include a body defining the first through-hole and the second through-hole such that the first through-hole is defined at an interior portion of the body and the second through-hole is defined at a perimeter portion of the body.

In addition to one or more of the features described above, or as an alternative to any of the foregoing embodiments, the captive clearance fit may be further defined as a fit between components in which the bolt is coupled to the spacer for constrained translatable movement without completely separating from the spacer.

In addition to one or more of the features described above, or as an alternative to any of the foregoing embodiments, the bolt may further include a head. The head and the second portion of the shaft may be arranged with the spacer such that the shaft may translate along an axis defined by spacer and such that the head and the second portion of the shaft may contact the spacer to impede the translation of the shaft.

In addition to one or more of the features described above, or as an alternative to any of the foregoing embodiments, the spacer may define a first spacer bore having a first bore diameter and may define a second spacer bore having a second bore diameter of a length value greater than a length value of the first bore diameter.

In addition to one or more of the features described above, or as an alternative to any of the foregoing embodiments, the first portion of the shaft may define a first shaft diameter and the second portion of the shaft may define a second shaft diameter. The spacer and the shaft may be further arranged with one another such that the spacer bore diameters and the shaft diameters are aligned with one another to provide a second clearance space between the first portion of the bolt and a second surface of the second through-hole.

In addition to one or more of the features described above, or as an alternative to any of the foregoing embodiments, the conduit assembly may further include a second conduit and a seal element disposed between the fitting component and the housing to absorb stresses received by the retention assembly to prevent or minimize cracking of the first conduit and the second conduit.

In addition to one or more of the features described above, or as an alternative to any of the foregoing embodiments, the spacer may define a bore for alignment with the second through-hole. The bore may be sized to receive the second portion of the bolt such that the second portion may retract completely into the bore when not secured to the housing.

Also disclosed is another retention assembly for a gas turbine engine. The retention assembly includes a bolt, a fitting component, a spacer, a housing, and a conduit assembly. The bolt includes a head and a shaft. The shaft has a first portion defining a first shaft diameter and a second portion defining a second shaft diameter. The second shaft diameter is of a length greater than the first shaft diameter. The fitting component includes a body defining a pair of first through-holes at an inner region of the body and defining a pair of second through-holes at a perimeter region of the body. The spacer includes a first element defining a first bore with a first bore diameter and a second element defining a second bore with a second bore diameter having a length greater than the first bore diameter. The housing defines at least one receiving aperture sized to receive the second portion of the shaft. The conduit assembly includes a pair of conduits for securing to the fitting component such that one of the pair of conduits is open to one of the pair of first through-holes. The bolt and the spacer are arranged with one another such that the head and the second portion of the shaft constrain bolt translation in two directions along an axis defined by one of the first bore and the second bore. The bolt, the spacer, the fitting component, and the housing are arranged with one another such that the second through-hole is aligned with the at least one receiving aperture and such that a first clearance space is defined between the first portion of the shaft and a surface of the first bore and a second clearance space is defined between the second portion of the shaft and a surface of the second bore. The clearance spaces are defined when the second portion of the shaft is disposed within the at least one receiving aperture.

In addition to one or more of the features described above, or as an alternative to any of the foregoing embodiments, the fitting component may include a body defining the first through-hole and the second through-hole such that the first through-hole is defined at an interior portion of the body and the second through-hole is defined at a perimeter portion of the body.

In addition to one or more features described above, or as an alternative to any of the foregoing embodiments, the bolt, the spacer, the fitting component, and the housing may be arranged with one another to define a captive clearance fit in which the bolt is coupled to the spacer for constrained translatable movement without completely separating from the spacer.

In addition to one or more features described above, or as an alternative to any of the foregoing embodiments, the bolt may further include a head. The head and the second portion of the shaft may be arranged with the spacer such that the shaft may translate along an axis defined by spacer and such that the head and the second portion of the shaft may contact the spacer to impede the translation of the shaft.

In addition to one or more features described above, or as an alternative to any of the foregoing embodiments, the first bore diameter may define a length equal to substantially between 0.276 inches and 0.286 inches.

In addition to one or more features described above, or as an alternative to any of the foregoing embodiments, the assembly may further include a seal element disposed between the fitting component and the housing to absorb stresses received by the retention assembly to prevent or minimize cracking of each of the pair of conduits.

In addition to one or more features described above, or as an alternative to any of the foregoing embodiments, the second bore may be aligned with the second through-hole and may be sized to receive the second portion of the bolt such that the second portion may retract completely into the second bore when not secured to the housing.

In addition to one or more features described above, or as an alternative to any of the foregoing embodiments, the second bore may be threaded and the second portion of the bolt may be threaded to mate with the threads of the second portion of the bolt.

In addition to one or more features described above, or as an alternative to any of the foregoing embodiments, the second bore diameter may define a length equal to substantially between 0.231 inches and 0.239 inches.

Also disclosed is a method for securing a fitting component to a housing of a gas turbine engine. The method includes arranging a bolt and spacer with one another to define a coupled relationship therebetween. The bolt includes a shaft defining first and second diameters and the bolt includes a head. The spacer includes a first through-hole defining third and fourth diameters. The bolt and the spacer are arranged with one another such that diameter differences between the bolt and spacer and permit partial translation of the bolt along a centerline defined by the through-hole while preventing the bolt and spacer from separating from one another to break the coupled relationship. The method further includes inserting a first end of the bolt through a second through-hole of a fitting component and into a housing aperture of a housing. The method further includes applying a pressing force to the spacer and the fitting component such that the spacer and the fitting component are joined with one another.

In addition to one or more of the features described above, or as an alternative to any of the foregoing embodiments, the fitting component may include a pair of first through-holes defined at an inner region of the fitting component and two pairs of second through-holes defined at a perimeter region of the fitting component.

In addition to one or more of the features described above, the first end of the bolt may be further inserted through a seal component disposed between the fitting component and the housing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
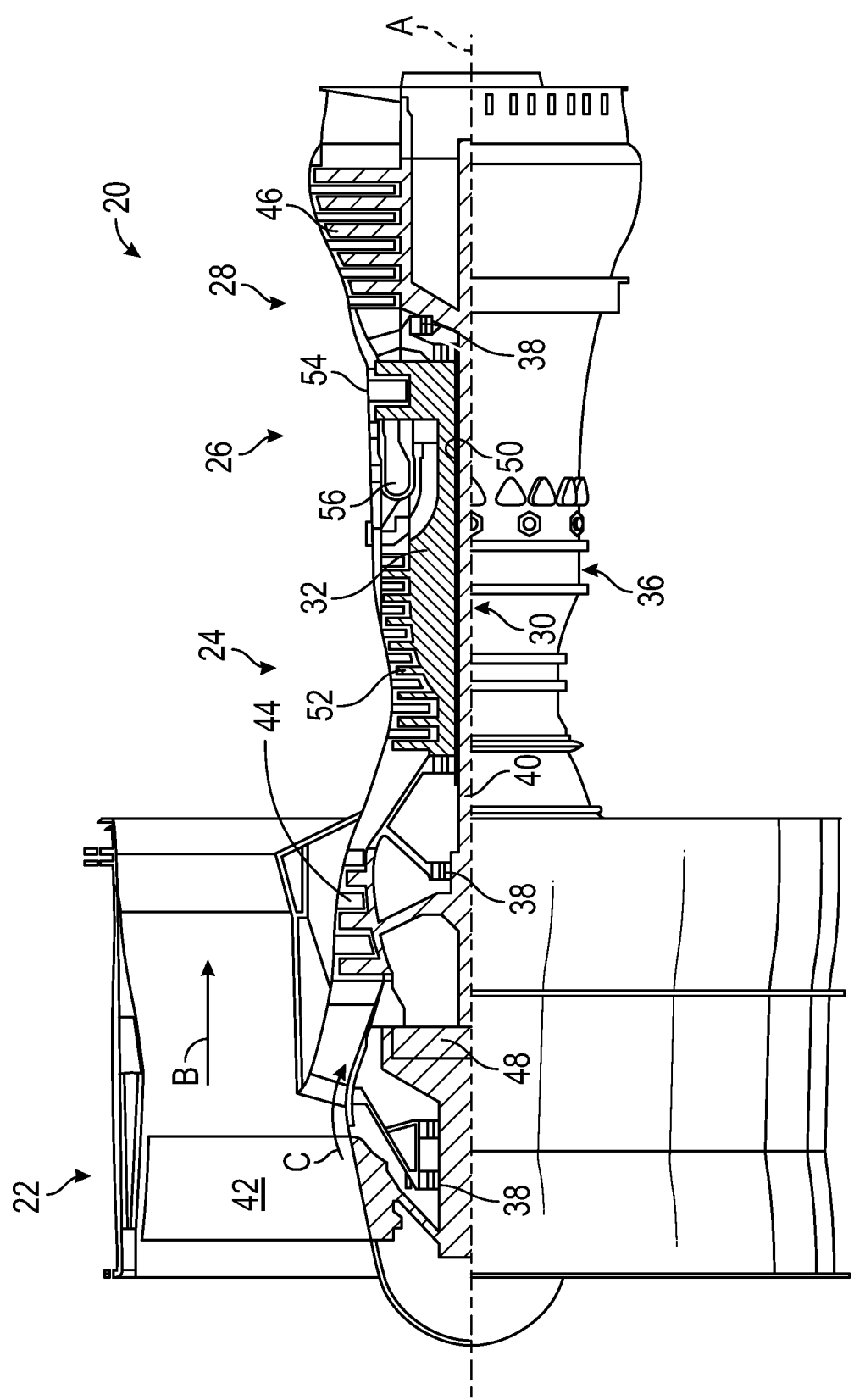
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ram} °R)/(518.7° R)]^{0.5}$. The "Low corrected fan tip speed" as disclosed herein according to one non-limiting embodiment is less than about 1150 ft/second (350.5 m/sec).

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 2:
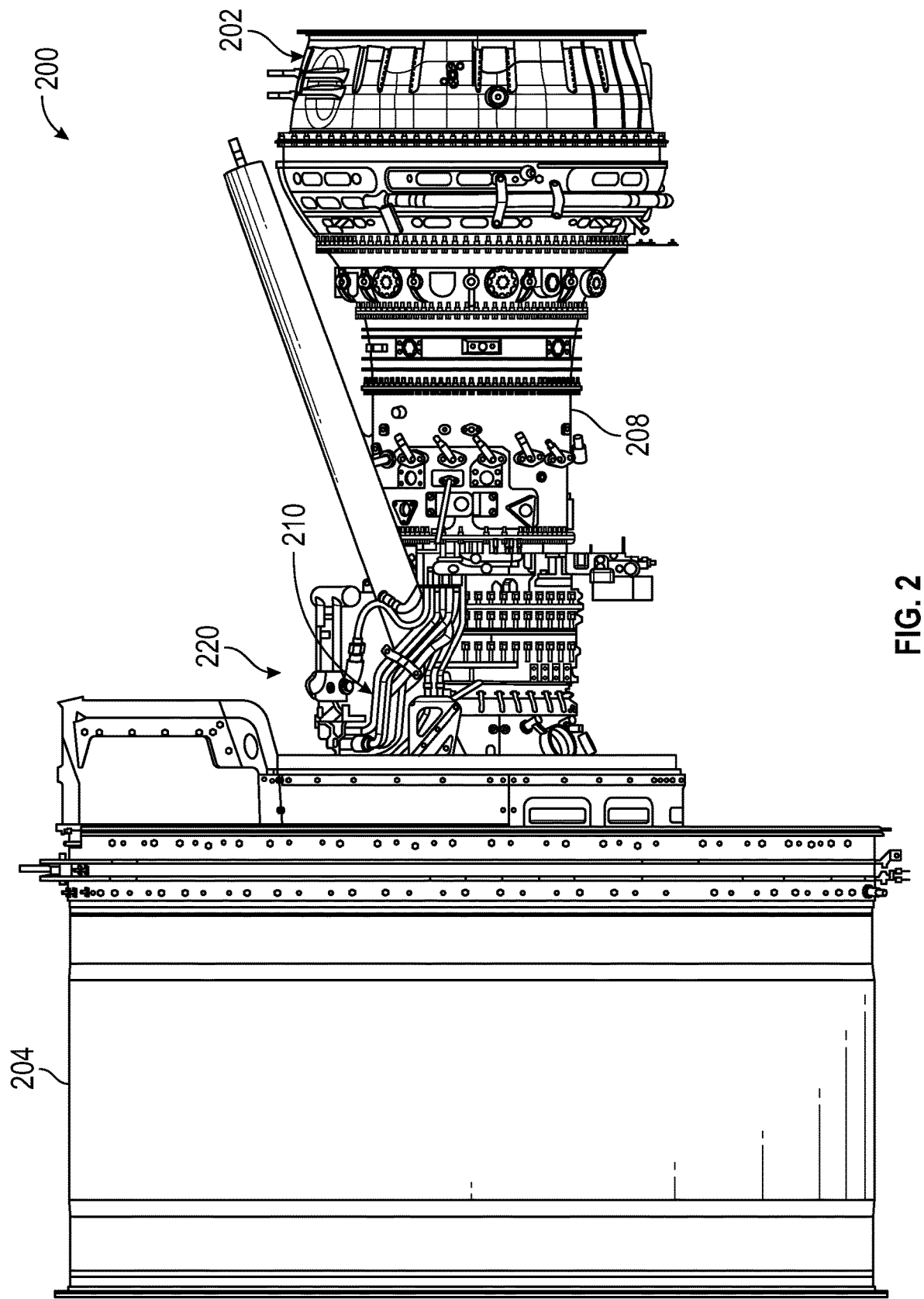
FIG. 2 is a side view illustrating an example of a portion of a gas turbine engine.

FIG. 2 is a side view illustrating an example of a portion of a gas turbine engine, referred to generally as an engine assembly 200 herein. The engine assembly 200 may be a part of a gas turbine engine, such as the engine 20 described in relation to FIG. 1. A combustor section 202 is shown mounted to a fan section 204 in FIG. 2. The combustor section 202 may include a housing 208 and a conduit assembly 210. The housing 208 may define an aperture sized to facilitate fluid communication between a conduit of the conduit assembly 210 and the combustor section 202. For example, a retention assembly 220 may be structured to secure the conduit assembly 210 to the housing 208 of the combustor section 202. The retention assembly 220 may be structured to provide an assembly including features to facilitate a captive relationship between a bolt and a spacer as further described herein.

Figure 3:
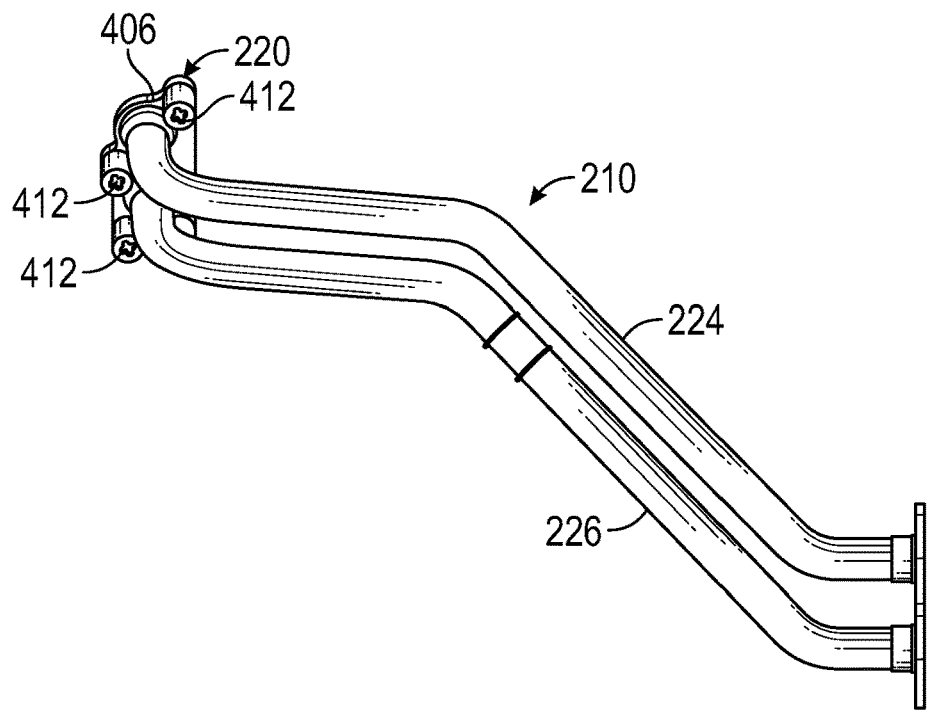
FIG. 3 is a perspective view illustrating an example of a tube assembly for a gas turbine engine.

FIG. 3 is a perspective view of the conduit assembly 210. The conduit assembly 210 may include a first conduit 224 and a second conduit 226. The first conduit 224 may operate to transfer fluid, such as fuel, from an engine wing to a fuel oil cooler. The second conduit 226 may operate to then transfer the fluid from the fuel oil cooler to a fuel system for fuel burn and/or fueldraulics.

Figure 4:
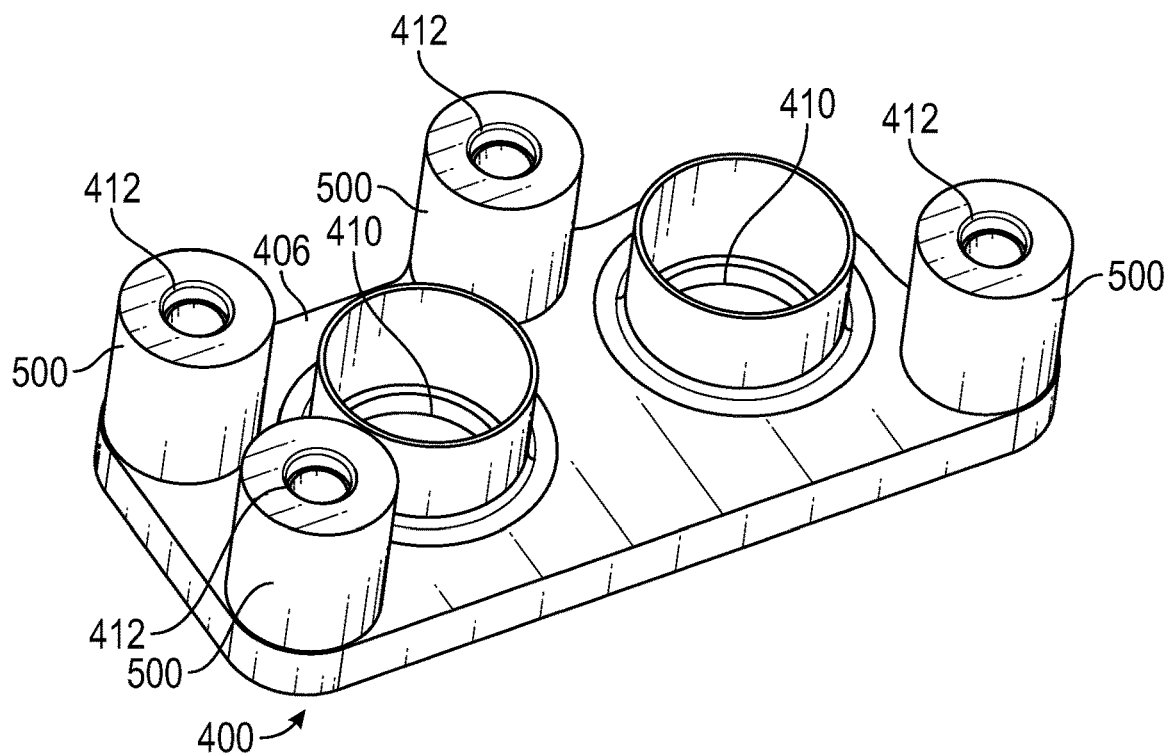
FIG. 4 is a perspective view illustrating an example of a fitting component for a gas turbine engine.

FIG. 4 is a perspective view of an example of a fitting component for a retention assembly of a gas turbine engine, referred to generally as a fitting component 400 herein. In one example, the fitting component 400 may be a part of a retention assembly for a gas turbine engine, such as the retention assembly 220. The fitting component may include a body 406 defining one or more through-holes to assist in securing the fitting component to a housing of a portion of a gas turbine engine. For example, the body 406 may define a pair of first through-holes 410 and two pairs of second through-holes 412 (in FIG. 4, each through-hole of the two pairs of second through holes 412 is identified at a through-hole of a respective spacer 500 including a through-hole aligned with a respective through-hole of the two pairs of second through-holes 412.).

Each through-hole of the pair of first through-holes 410 may be disposed at an interior region of the body 406 and each through-hole of the two pairs of second through-holes 412 may be disposed at a perimeter region of the body 406. Each of the pair of first through-holes 410 may be located adjacent each of the two pairs of second through-holes 412.

Each of the pair of first through-holes 410 may be sized to facilitate mating between the fitting component 400 and a conduit, such as the first conduit 224 or the second conduit 226 described in relation to FIG. 3. Each of the two pairs of second through-holes 412 may be sized to receive a portion of a bolt as further described herein.

Figure 5:
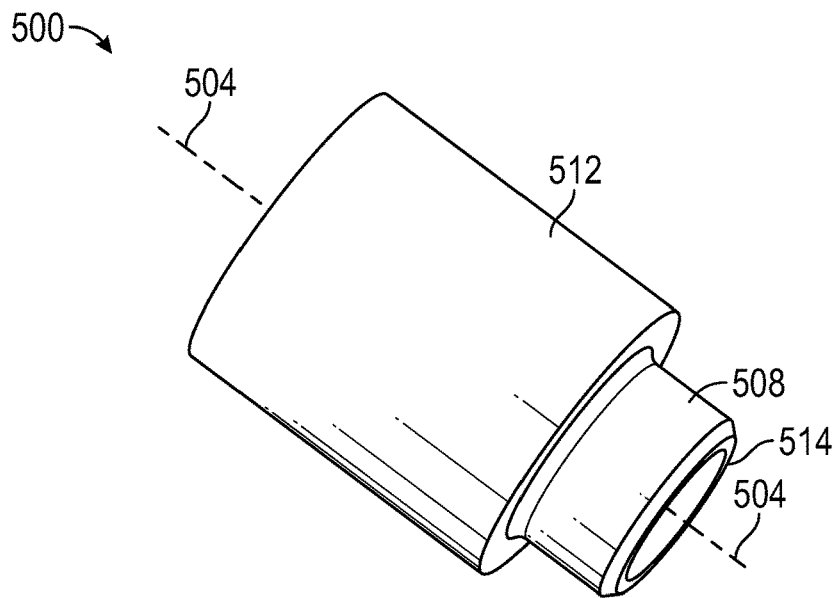
FIG. 5 is a perspective view illustrating an example of a spacer for a gas turbine engine.

FIG. 5 is a perspective view of the spacer 500. The spacer 500 may define a central axis 504. The spacer 500 may include a first element 508 and a second element 512. The spacer 500 may define a bore or through-hole sized and structured to receive a fastener. For example, the spacer 500 may define a first bore 510 (not visible in FIG. 5) and a second bore 514. Each of the first bore 510 and the second bore 514 (the first bore 510 and the second bore 514 are shown in at least FIG. 7) may be threaded to assist in securing a fastener, such as a bolt, to the spacer 500 and/or to an engine housing, such as the housing 208.

Figure 6A:
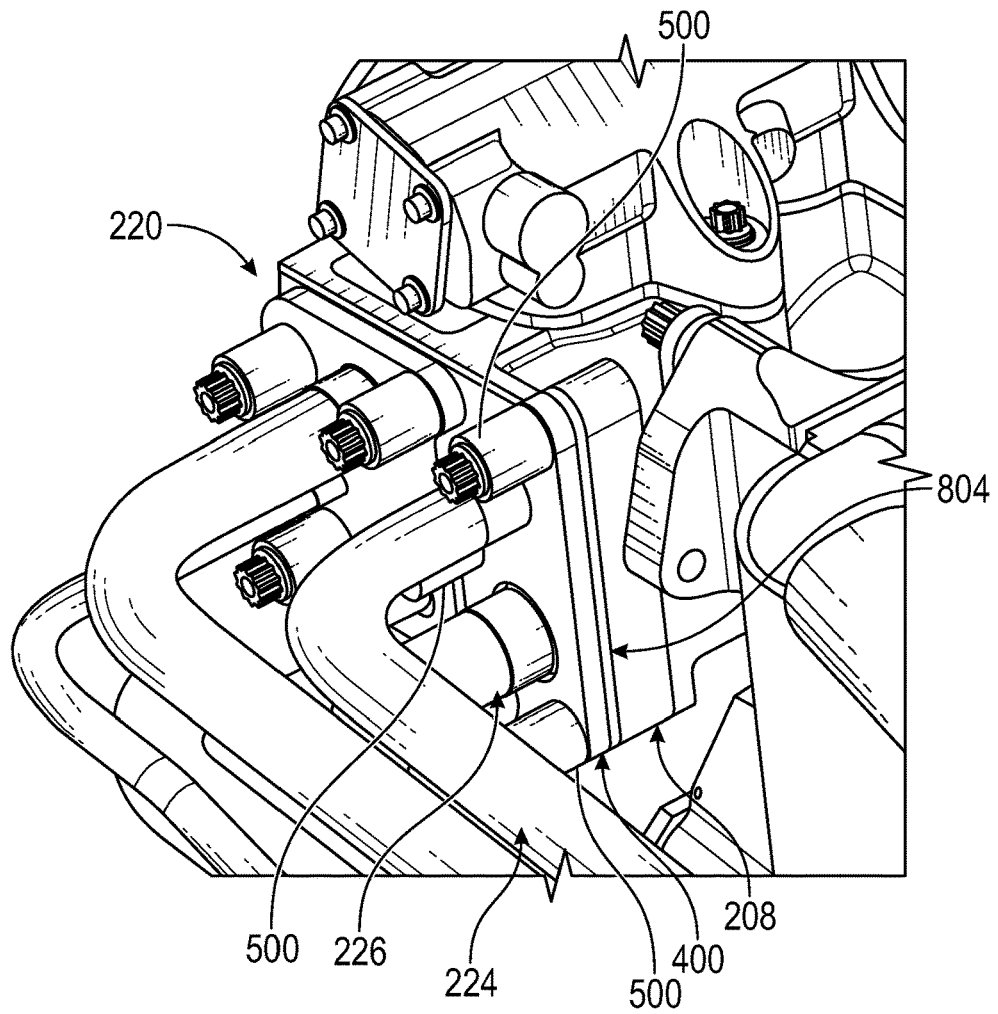
FIG. 6A is a perspective view illustrating an example of a retention assembly for a gas turbine engine.
Figure 6B:
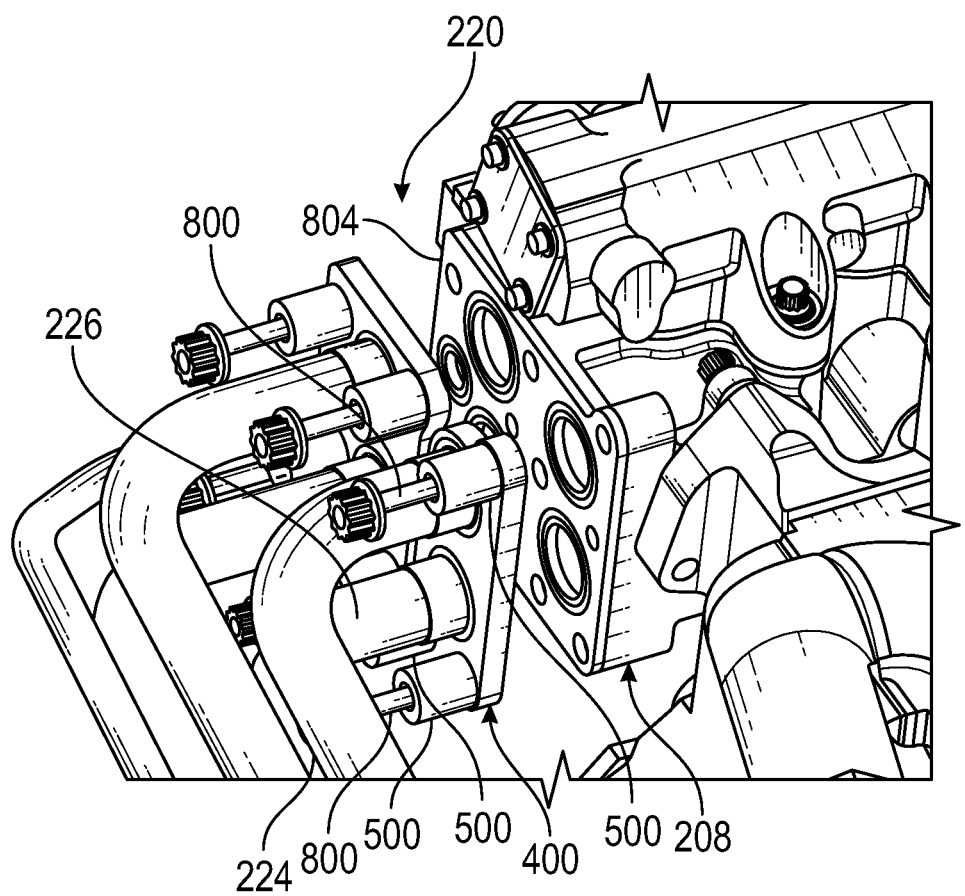
FIG. 6B is a perspective, exploded view of the retention assembly of FIG. 6A.

FIGS. 6A and 6B illustrate an example of a portion of the retention assembly 220. FIG. 6A is a perspective view of the retention assembly 220 shown mounted to the housing 208. FIG. 6B is a partially exploded view of the retention assembly 220. The retention assembly 220 may operate to assist in retaining conduits, such as the first conduit 224 and the second conduit 226, in a position relative to a gas turbine engine as described herein. A structure of components of the retention assembly 220 may be such that cracking of the conduits is prevented or minimized during operation of the gas turbine engine.

Figure 7:
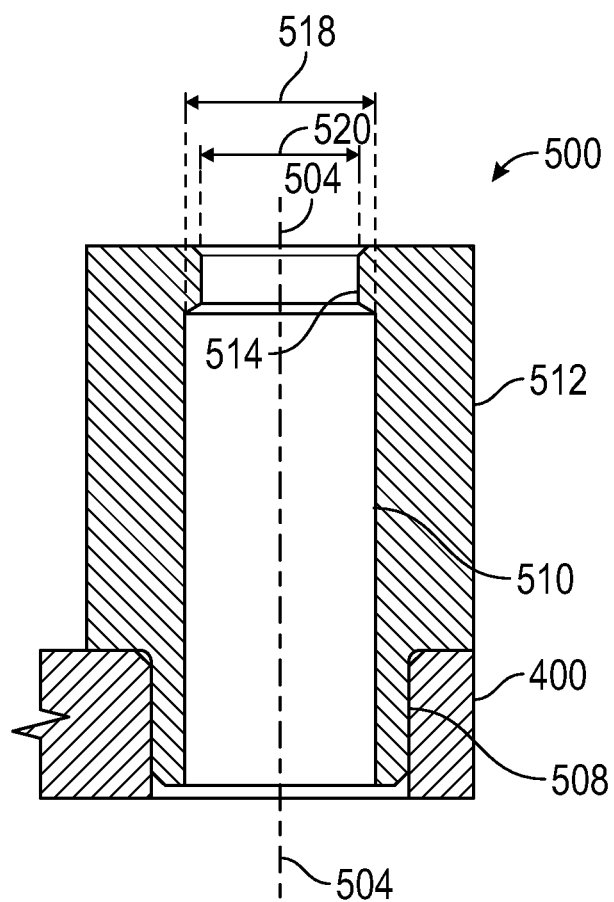
FIG. 7 is a side view, in cross-section, of an example of a portion of the retention assembly of FIG. 6 showing a relationship between a shaft, a spacer, and a fitting component.

FIG. 7 is side view, in cross-section, illustrating an example of the spacer 500 mounted to a portion of a retention assembly, such as the fitting component 400 described in relation to FIG. 4. The first bore 510 may define a diameter having a length represented by a dimension 518 shown in FIG. 7. The dimension 518 may be of a length value such that a threaded lower portion of a bolt may be housed completely within the first bore 510 when the bolt is not attached to another component, such as an engine housing. The second bore 514 may define a diameter having a length represented by a dimension 520 shown in FIG. 7. The length of the diameter of the first bore 510 may be greater than the length of the diameter of the second bore 514. In one example, the diameter of the first bore 510 may be substantially equal to between 0.276 inches and 0.286 inches and the diameter of the second bore 514 may be substantially equal to between 0.231 inches and 0.239 inches.

Figure 8A:
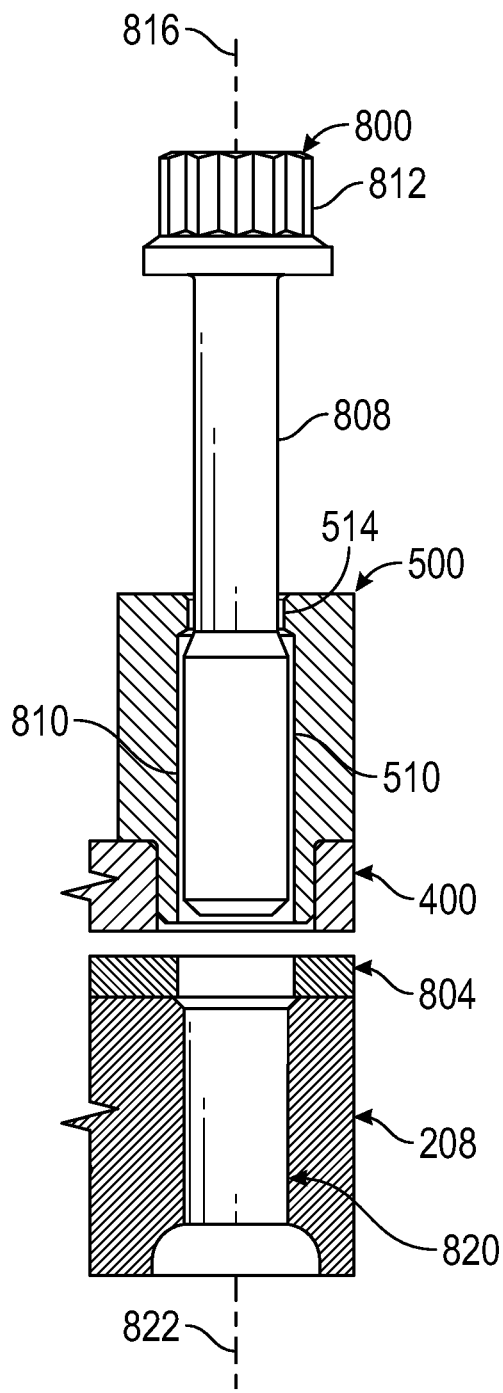
FIG. 8A is a side view, in cross-section, illustrating an example of a first position of a retention assembly for a gas turbine engine.
Figure 8B:
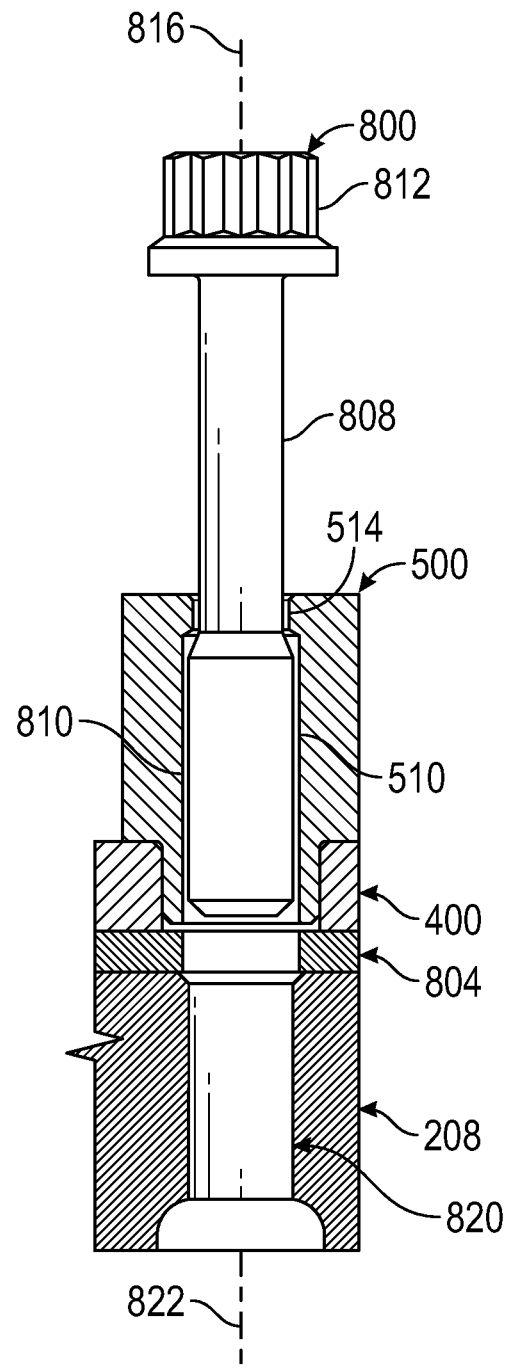
FIG. 8B is a side view, in cross-section, illustrating an example of a second position of a retention assembly for a gas turbine engine.
Figure 8C:
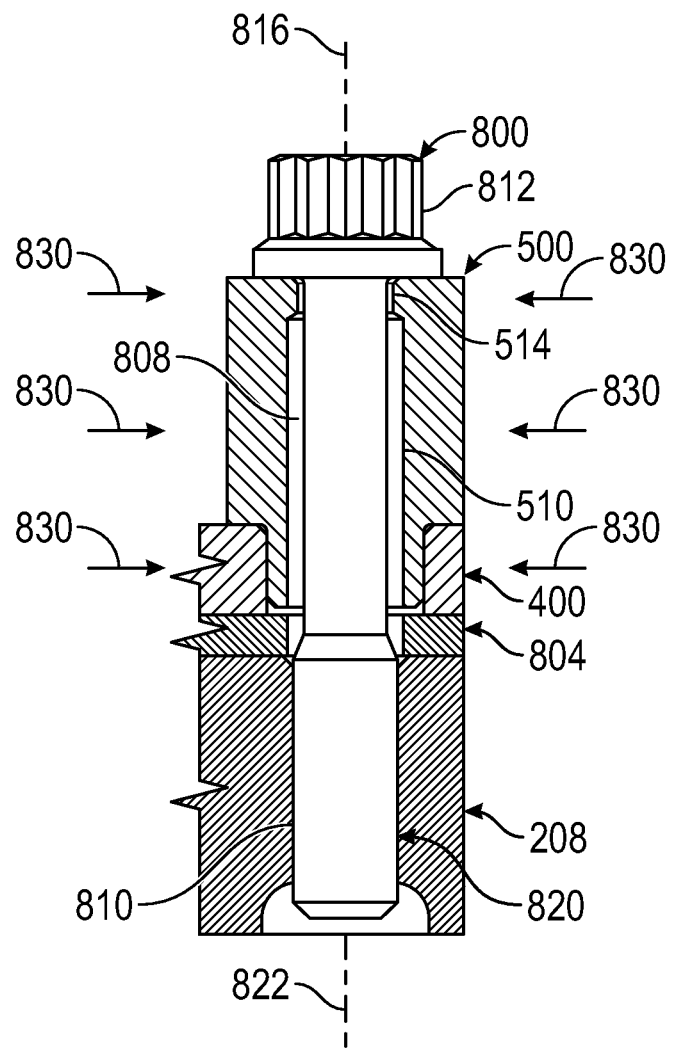
FIG. 8C is a side view, in cross-section, illustrating an example of a third position of a retention assembly for a gas turbine engine.

FIGS. 8A through 8C illustrate example configurations of portions of the retention assembly 220. The retention assembly 220 may include a bolt 800, the fitting component 400, and the spacer 500. FIG. 8A illustrates an example of a portion of a first configuration of the retention assembly 220 in which a spacer, such as the spacer 500, and a bolt, such as the bolt 800, are arranged with one another and spaced from a housing, such as the housing 208. Further, in FIG. 8A, the spacer 500 is shown arranged with the fitting component 400 and a seal plate 804 is shown arranged with the housing 208. The bolt 800 may include a shaft having a first portion 808, a second portion 810, and a head 812. Each of a first bore, such as the first bore 510, and a fitting component, such as the fitting component 500, may define a first central axis 816. The housing 208 may include a third bore 820 defining a second central axis 822. The first central axis 816 and the second central axis 822 may substantially share a same axis.

The first bore 510 may define a diameter of a value greater than a diameter value of the second portion 810 of the bolt 800 such that clearance space is defined between the second portion 810 and a surface of the first bore 510 as shown in FIGS. 8A through 8C. The second bore 514 may define a diameter of a value greater than a diameter value of the first portion 808 of the bolt such that clearance space is defined between the first portion and a surface of the second bore 514 as shown in FIGS. 8A through 8C. Further, the first bore 510 may be sized such that the second portion 810 of the bolt 800 may retract completely within the first bore 510 when the bolt 800 is not secured to the housing 208.

FIG. 8B illustrates an example of a portion of a second configuration of the retention assembly 220. In this second configuration, the fitting component 400 is shown contacting the seal plate 804 located adjacent a portion of the housing 208.

FIG. 8C illustrates an example of a portion of a third configuration of the retention assembly 220. In this third configuration, the bolt 800 is shown secured to the housing 208 to define a captive clearance fit in which a first clearance space is defined between one or more surfaces of the first bore 510 and the bolt 800. The captive clearance fit may further be defined as a fit relationship in which the bolt 800 is coupled to the spacer 500 for constrained translatable movement without completely separating from the spacer 500. For example, the second portion 840 of the shaft 800 may be threaded and the third bore 820 may be threaded to facilitate a threaded attachment between the second portion 840 of the shaft 800 and the housing 208. Additionally, one or more press forces, as represented by arrows 830 in FIG. 8C, may be applied to the fitting component 400 and/or to the spacer 500 to join the fitting component 400, the spacer 500, and the bolt 800 with one another.

Figure 9:
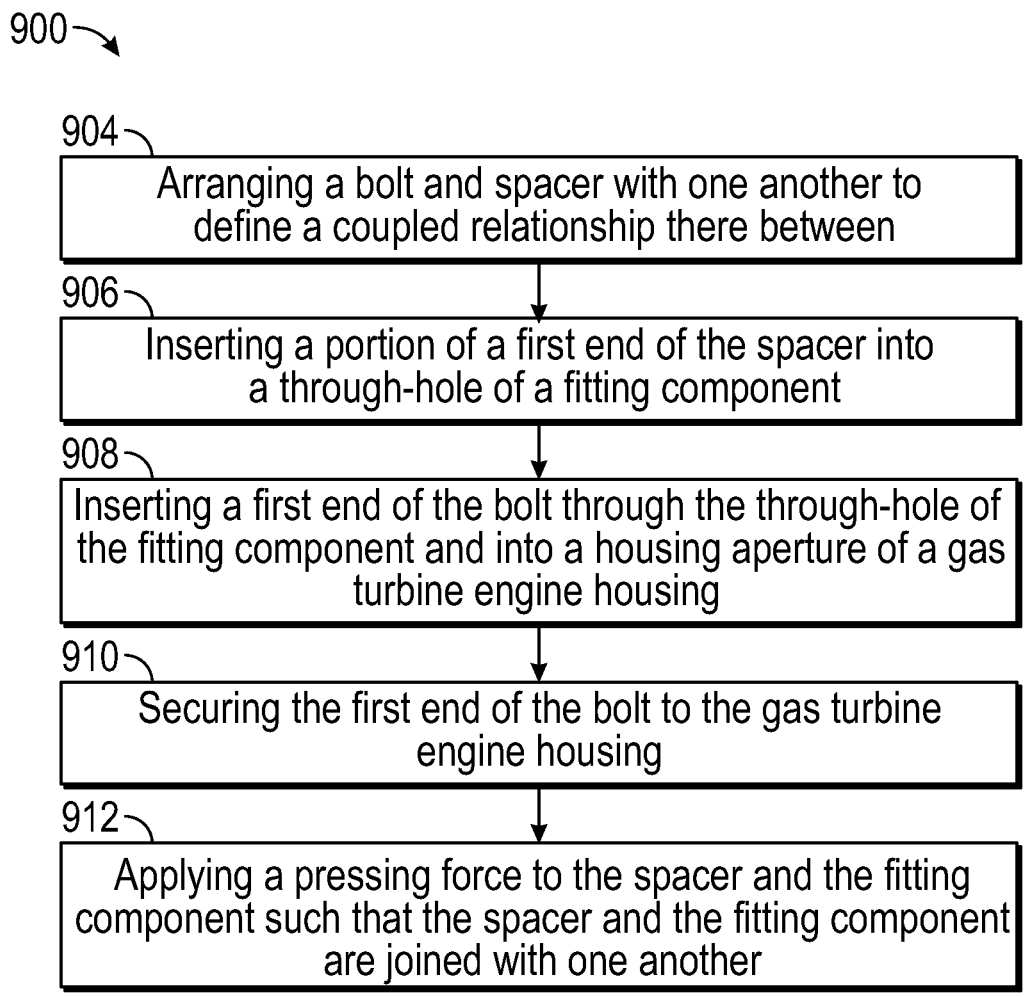
FIG. 9 is a flow chart illustrating an example of a method for securing a fitting component to a tube assembly of a gas turbine engine.

FIG. 9 is a flow chart illustrating an example of a method for securing a fitting component to a housing of a gas turbine engine, referred to generally as a method 900 herein. In operation 904, a bolt, such as the bolt 800, and a spacer, such as the spacer 500, may be arranged with one another to define a coupled relationship therebetween. In this example, the coupled relationship may be defined as a relationship in which the bolt is translatable within one or more aligned bores defined by the spacer along an axis and such that a head of the bolt and a lower portion of the bolt constrain movement of the bolt when contacting the spacer.

In operation 906, a portion of a first end of the spacer may be inserted into a through-hole of a fitting component. In operation 908, a first end of the bolt may be inserted into the through-hole of the fitting component and into a housing aperture of a gas turbine engine.

In operation 910, the first end of the bolt may be secured to the gas turbine engine housing. For example, the first end of the bolt and the gas turbine engine housing may define threads to facilitate securement to one another. In operation 912, a pressing force may be applied to the spacer and the fitting component such that the spacer and fitting component are joined with one another.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A retention assembly for a gas turbine engine comprising:
   a bolt including a shaft having a first portion and a second portion;
   a spacer;
   a housing defining at least one receiving aperture sized to receive the second portion of the shaft;
   a fitting component defining a first through-hole and a second through-hole located adjacent to the first through-hole, the second through-hole being sized for the first portion of the shaft and the second portion of the shaft to extend therethrough; and a conduit assembly including a first conduit for securing to the fitting component such that the first through-hole is open to the first conduit, wherein the bolt, the spacer, the fitting component, and the housing are arranged with one another to define a captive clearance fit such that a first clearance space is defined between a first surface of the second through-hole and the first portion of the bolt when the spacer and fitting component are joined with one another via a press force.

2. The assembly of claim 1, wherein the fitting component includes a body defining the first through-hole and the second through-hole such that the first through-hole is defined at an interior portion of the body and the second through-hole is defined at a perimeter portion of the body.

3. The assembly of claim 1, wherein the captive clearance fit is further defined as a fit between components in which the bolt is coupled to the spacer for constrained translatable movement without completely separating from the spacer.

4. The assembly of claim 1, wherein the bolt further includes a head, and wherein the head and the second portion of the shaft are arranged with the spacer such that the shaft may translate along an axis defined by spacer and such that the head and the second portion of the shaft may contact the spacer to impede translation of the shaft.

5. The assembly of claim 1, wherein the spacer defines a first spacer bore having a first bore diameter and defines a second spacer bore having a second bore diameter of a length value less than a length value of the first bore diameter.

6. The assembly of claim 5, wherein the first portion of the shaft defines a first shaft diameter and the second portion of the shaft defines a second shaft diameter, the spacer and the shaft being further arranged with one another such that the first bore diameter and the second bore diameter and the first shaft diameter and the second shaft diameter are aligned with one another to provide a second clearance space between the first portion of the bolt and a second surface of the second through-hole.

7. The assembly of claim 1, wherein the conduit assembly further includes a second conduit and a seal element disposed between the fitting component and the housing to absorb stresses received by the retention assembly to prevent or minimize cracking of the first conduit and the second conduit.

8. The assembly of claim 1, wherein the spacer defines a bore for alignment with the second through-hole, the bore being sized to receive the second portion of the bolt such that the second portion may retract completely into the bore when not secured to the housing.

9. A retention assembly for a gas turbine engine comprising:
a bolt including a head and a shaft, the shaft having a first portion defining a first shaft diameter and a second portion defining a second shaft diameter, the second shaft diameter being of a length greater than the first shaft diameter;
a fitting component including a body defining a pair of first through-holes at an inner region of the body and defining a pair of second through holes at a perimeter region of the body;
a spacer defining a first bore with a first bore diameter and defining a second bore with a second bore diameter having a length less than the first bore diameter;
a housing defining at least one receiving aperture sized to receive the second portion of the shaft; and
a conduit assembly including a pair of conduits for securing to the fitting component such that one of the pair of conduits is open to one of the pair of first through-holes,
wherein the bolt and the spacer are arranged with one another such that the head and the second portion of the shaft constrain bolt translation in two directions along an axis defined by one of the first bore and the second bore, and wherein the bolt, the spacer, the fitting component, and the housing are arranged with one another such that one of the pair of second through holes is aligned with the at least one receiving aperture and such that a first clearance space is defined between the first portion of the shaft and a surface of the first bore and a second clearance space is defined between the second portion of the shaft and a surface of the second bore, the first clearance space and the second clearance space being defined when the second portion of the shaft is disposed within the at least one receiving aperture.

10. The assembly of claim 9, wherein the bolt, the spacer, the fitting component, and the housing are arranged with one another to define a captive clearance fit in which the bolt is coupled to the spacer for constrained translatable movement without completely separating from the spacer.

11. The assembly of claim 9, wherein the bolt further includes a head, and wherein the head and the second portion of the shaft are arranged with the spacer such that the shaft may translate along an axis defined by spacer and such that the head and the second portion of the shaft may contact the spacer to impede translation of the shaft.

12. The assembly of claim 9, wherein the first bore diameter defines a length equal to substantially between 0.276 inches and 0.286 inches.

13. The assembly of claim 9 further comprising a seal element disposed between the fitting component and the housing to absorb stresses received by the retention assembly to prevent or minimize cracking of each of the pair of conduits.

14. The assembly of claim 9, wherein the second bore is aligned with one of the pair of second through holes and is sized to receive the second portion of the bolt such that the second portion may retract completely into the second bore when not secured to the housing.

15. The assembly of claim 9, wherein the second bore is threaded and the second portion of the bolt is threaded to mate with threads of the second portion of the bolt.

16. The assembly of claim 9, wherein the second bore diameter defines a length equal to substantially between 0.231 inches and 0.239 inches.

17. A method for securing a fitting component to a housing of a gas turbine engine comprising:
arranging a bolt and spacer with one another to define a coupled relationship therebetween, the bolt including a shaft defining first and second diameters and including a head, the spacer including a first through-hole defining third and fourth diameters, the bolt and spacer being arranged with one another such that diameter differences between the bolt and spacer permit partial translation of the bolt along a centerline defined by the first through-hole while preventing the bolt and spacer from separating from one another to break the coupled relationship;

inserting a first end of the bolt through a second through-hole of a fitting component and into a housing aperture of a housing; and applying a pressing force to the spacer and the fitting component such that the spacer and the fitting component are joined with one another.

18. The method of claim 17, wherein the fitting component comprises a pair of first through-holes defined at an inner region of the fitting component and two pairs of second through-holes defined at a perimeter region of the fitting component.

19. The method of claim 17, wherein the first end of the bolt is further inserted through a seal component disposed between the fitting component and the housing.

* * * * *